United States Patent
Doolin et al.

[19]

[11] Patent Number: 5,913,659
[45] Date of Patent: Jun. 22, 1999

[54] APPARATUS AND METHOD FOR ADJUSTING ROTOR BLADE TRACKING

[75] Inventors: Leonard J. Doolin, Southbury; Stephen V. Poulin, Stratford, both of Conn.

[73] Assignee: United Technologies Corporation, Hartford, Conn.

[21] Appl. No.: 08/155,921

[22] Filed: Nov. 22, 1993

[51] Int. Cl.$^6$ .................................................. B64C 27/51
[52] U.S. Cl. ..................... 416/107; 416/134 A; 416/138; 416/140; 267/141.4; 267/294; 464/52
[58] Field of Search ....................... 416/106, 107, 416/134 A, 138 R, 138 A, 140 R, 140 A, 141 R, 141 A; 244/17.27; 267/141.1, 141.4, 294; 384/221; 464/51, 52, 87, 170

[56] References Cited

U.S. PATENT DOCUMENTS

| | | |
|---|---|---|
| 3,504,905 | 4/1970 | Irwin . |
| 3,589,835 | 6/1971 | Linden . |
| 3,606,295 | 9/1971 | Appleton . |
| 3,610,610 | 10/1971 | Chassagne . |
| 3,679,197 | 7/1972 | Schmidt . |
| 3,806,106 | 4/1974 | Hamel et al. . |
| 3,842,945 | 10/1974 | Potter . |
| 3,952,546 | 4/1976 | Nakano et al. . |
| 3,999,887 | 12/1976 | McGuire . |
| 4,028,000 | 6/1977 | Weiland et al. ......................... 416/107 |
| 4,040,690 | 8/1977 | Finney . |
| 4,097,193 | 6/1978 | Brünsch et al. . |
| 4,105,266 | 8/1978 | Finney . |
| 4,108,508 | 8/1978 | Clinard, Jr. . |
| 4,121,813 | 10/1978 | Inuzuka . |
| 4,129,403 | 12/1978 | Watson . |
| 4,135,856 | 1/1979 | McGuire . |
| 4,182,138 | 1/1980 | McGuire . |
| 4,244,677 | 1/1981 | Noehren et al. . |
| 4,249,862 | 2/1981 | Waddington et al. . |
| 4,256,354 | 3/1981 | Peterson . |
| 4,257,739 | 3/1981 | Covington et al. . |
| 4,297,078 | 10/1981 | Martin . |
| 4,304,525 | 12/1981 | Mouille . |
| 4,349,184 | 9/1982 | Peterson et al. . |
| 4,360,337 | 11/1982 | Frommlet et al. . |
| 4,407,633 | 10/1983 | Mouille . |
| 4,522,563 | 6/1985 | Reyes et al. . |
| 4,549,850 | 10/1985 | Vincent . |
| 4,566,677 | 1/1986 | Le Pierres . |
| 4,575,358 | 3/1986 | Ferris . |
| 4,580,945 | 4/1986 | Miller . |
| 4,588,356 | 5/1986 | Pariani . |

(List continued on next page.)

*Primary Examiner*—Edward K. Look
*Assistant Examiner*—Christopher Verdier
*Attorney, Agent, or Firm*—McAulay Fisher Nissen, Goldberg & Kiel

[57] ABSTRACT

A helicopter rotor has two or more blades which extend from a hub and has an adjustment mechanism for adjusting the lead/lag variation of the blades which typically occur due to manufacturing tolerance variations or to changes which occur through operation such as softening of the supporting elastomer dampers. One embodiment of the invention incorporates an end plate on an upper damper with a lug positioned adjacent to a lug on the torque tube such that the end plate of the damper can be changed relative to the longitudinal axis of the blade. For example, a ±½ degree adjustment can be made in the blade angle relative to the hub to insure that lead/lag errors are reduced. In another embodiment, the damper set includes extended metal shims adjacent to the end most laminate plys of the upper and lower dampers such that these shims can be bolted to the end plates of the snubber assemblies for step increasing the stiffness of the assemblies. Utilizing the apparatus of the invention, each blade of the rotor can be adjusted to balance the rotor assembly to minimize vibration.

15 Claims, 6 Drawing Sheets

U.S. PATENT DOCUMENTS

| | | |
|---|---|---|
| 4,639,193 | 1/1987 | Reichert et al. . |
| 4,652,210 | 3/1987 | Leman et al. . |
| 4,676,669 | 6/1987 | Byrnes et al. . |
| 4,690,616 | 9/1987 | Hahn et al. . |
| 4,754,958 | 7/1988 | Markowski . |
| 4,778,343 | 10/1988 | Hahn et al. . |
| 4,804,352 | 2/1989 | Schmidt . |
| 4,815,937 | 3/1989 | Aubry et al. . |
| 4,859,148 | 8/1989 | Hibyan . |
| 4,874,292 | 10/1989 | Matuska et al. . |
| 4,877,375 | 10/1989 | Desjardins . |
| 4,886,419 | 12/1989 | McCafferty . |
| 4,893,988 | 1/1990 | Sato . |
| 4,895,354 | 1/1990 | Byrnes . |
| 4,915,585 | 4/1990 | Guimbal . |
| 4,930,983 | 6/1990 | Byrnes et al. . |
| 4,961,687 | 10/1990 | Bost et al. . |
| 4,986,735 | 1/1991 | Robinson . |
| 5,092,738 | 3/1992 | Byrnes et al. . |

APPARATUS AND METHOD FOR ADJUSTING ROTOR BLADE TRACKING

BACKGROUND OF THE INVENTION

FIELD OF THE INVENTION

This invention relates to helicopter rotors having a plurality of blades which move substantially in a common plane of track and more particularly to means for adjusting individual rotor blades to correct for lead/lag and flap track errors.

A helicopter rotor typically includes two or more blades which extend from a hub. For a particular type of rotor head such as a bearingless main rotor (BMR), each blade typically has associated with it a flexible spar which extends from the hub. The spar is used to connect the blade to the hub. A torque tube surrounds the spar and has a control rod attached to it which allows a pilot to change the blade pitch. A pair of snubber dampers are disposed between the spar and the torque tube to support the torque tube in proper relationship with the spar. The snubber dampers transfer push rod loads from the torque tube through the snubbers into the spar.

A snubber damper consists of a series of spherical (snubber) and flat (damper) shims separated by elastomeric layers. The two snubbers located above and below the spar combine to form a spherical bearing which is used to support and position the torque tube in a proper relationship to the spar for limiting pitching and flapping motions. The damper portions combine to provide sufficient damping of blade lead/lag motion to maintain rotor stability.

As the rotor turns, the blades define a circular track. Due to the bolted attachment of the blades to the hub, or slight differences in manufacturing tolerances, such as in the spring rate of the snubbers, it is possible for tracking errors to occur. Track errors may be exhibited by a change in spacing between adjacent blades, i.e., a lead/lag error, or out of the plane of the track, i.e. a flapping error. Even slight variations at the hub can translate to large variations at the blade tips. The result of these variations is that the rotor acts as an unbalanced assembly with consequent vibration. It is beyond present manufacturing capabilities to eliminate these variations.

SUMMARY OF INVENTION

It is an object of the present invention to provide means for adjusting the position of each blade extending from a rotor hub to eliminate lead/lag tracking errors.

It is another object of the present invention to provide means for adjusting the stiffness of each damper of a blade assembly to reduce lead/lag and flap tracking errors.

These and other objects of the present invention are achieved by a helicopter rotor having flexible spar means, hub means retaining the spar means a plurality of blades extending from the spar means, torque tube means associated with each blade for adjusting blade pitch, snubber damper members disposed on opposite sides of the flexible spar means for maintaining torque tube position while transmitting pitch control changes to the blade means from the torque tube means, and means for adjusting the angular relationship of the spar means to the hub means to correct lead/lag errors. In another embodiment of the invention, the helicopter rotor includes means to adjust the stiffness of the snubber damper members, to reduce lead/lag and flap tracking errors.

In one embodiment, the torque tube has a lug fixed on an upper surface thereof adjacent a top plate of a snubber damper. The plate has a facing lug with a positioning screw disposed therebetween, for adjusting the position of the upper plate of the snubber relative to the torque tube to provide at least about a ½ degree plus or minus adjustment of the blade lead/lag. Thus, the position of each blade could be adjusted to correct for lead/lag errors and provide a rotor which is balanced to insure correct spacing between blades under loaded conditions.

In another embodiment of the invention, the snubber damper means comprise upper and lower dampers, each of which includes a plurality of flat elastomeric plies with interleaved metal or composite shims. The outermost elastomeric ply of one damper is preferably of different stiffness than the outermost elastomeric ply of the other damper. The outermost shim is disposed so as to sandwich the outermost ply between the shim and a damper end plate. Each outermost shim has an extending portion which includes means for fixing to the end plate of the damper, to essentially eliminate one elastomeric layer of the damper.

Each damper set thus has a range of stiffness adjustment to correct lead/lag track errors. If the damper set is too soft, the metal shim associated with one damper is attached to an end plate. This restricts the movement of the sandwiched end ply layer, making the damper stiffer. If this makes the damper too stiff or too soft, alternatively, the other outermost shim of the other damper with a different stiffness elastomeric ply is attached to its corresponding end plate. In each instance, attachment of the shim reduces the number of elastomeric plies available for damping, stiffing the damper set. Of course, both plies can be eliminated to provide the stiffest assembly. Thus, there is a range of adjustment possibilities that permits correcting the stiffness of each blade for an entire rotor system. Each blade can be individually tuned with the apparatus of the invention to remove tracking errors to minimize rotor assembly vibration.

DESCRIPTION OF THE PREFERRED EMBODIMENT

Figure 1:
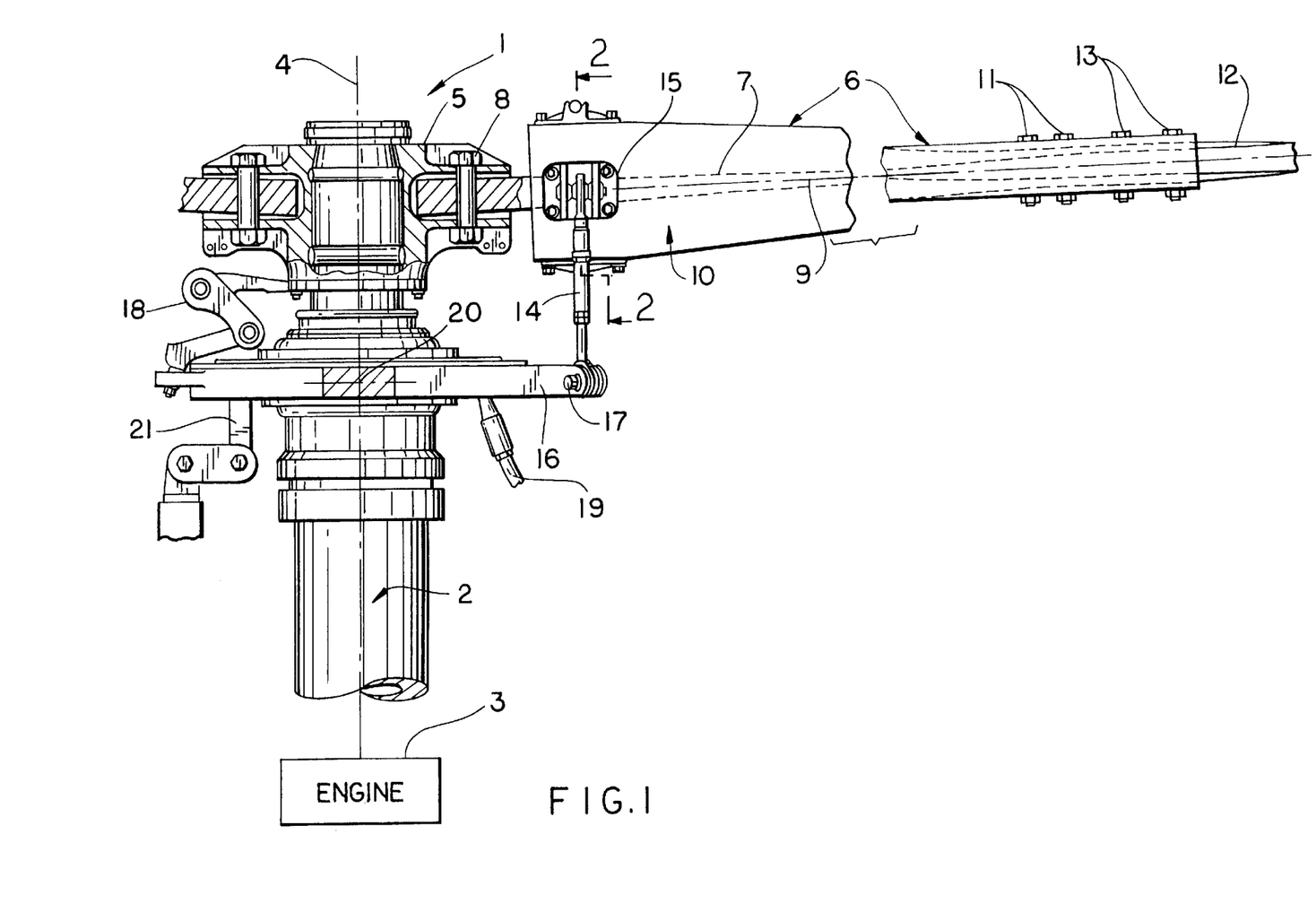
FIG. 1 is a partial cross sectional side view showing a helicopter flexbeam rotor.

FIG. 1 shows the pertinent portions of a helicopter flexbeam rotor 1 which includes a drive shaft 2 which is driven in conventional fashion by an engine 3, probably through reduction gearing (not shown), for rotation about an axis of rotation 4. A rotor hub 5 is mounted on the drive shaft 2 for rotation therewith about axis 4, the hub supporting a series of blade assemblies, one of which is shown as 6. The blade assembly 6 includes a flexbeam spar 7 integrally connected to the rotor hub 5 by a set of connecting bolts 8. The flexbeam is to be flexible about pitch change axis 9. A torque tube 10 envelopes the flexbeam spar 7 in spaced relation thereto, and is connected at its radially outer end by connecting bolts 11, and is articulately connected to the spar 7 through a snubber-damper mechanism which is described hereafter. The torque tube 10 is connected to an aerodynamic blade member 12 by connecting bolts 13 so that, as the drive shaft rotates about the axis of rotation 4, the flexbeam 7, torque tube 10 and blade member 12 rotate therewith.

While FIG. 1 shows a flexbeam spar member 7 supporting a single blade member 12, this is because the particular construction illustrated is part of a helicopter rotor system having an odd number of blades. If the helicopter had an even number of blades, a single flexbeam member 7 could be utilized to support diametrically opposed blade members.

Pitch change loads are imparted to the blade assembly 6 by pitch control rods 14 which are pivotally connected at one end to the outer periphery of the torque tube 10 by conventional connecting means 15. The pitch control rod 14 is pivotally connected to a swashplate 16 through a connecting bolt 17. An outer ring of the swashplate 16 is connected by a scissor arrangement 18 to the rotor hub 5 so as to rotate therewith. An inner stationary ring of the swashplate 16 receives pitch control inputs from actuator members 19 to cause the swashplate to tilt about point 20. A bearing (not shown) separates the inner and outer ring.

In this fashion, pitch control commands imparted by the swashplate actuators cause tilting of the swashplate so as to impart pitch change loads to the torque tube through the pitch control rod 14, resulting in a pitch change motion of the torque tube about the pitch change axis 9. This pitch change load will be imparted to the flexbeam 7 and blade 12 through the torque tube 10 and supported by the snubber-damper mechanism. When the swashplate translates along the axis 4, it imparts a collective pitch change to the blade assemblies 6, and when it tilts about point 20, it imparts a cyclic pitch change to the blade assemblies.

Figures 2, 2A:
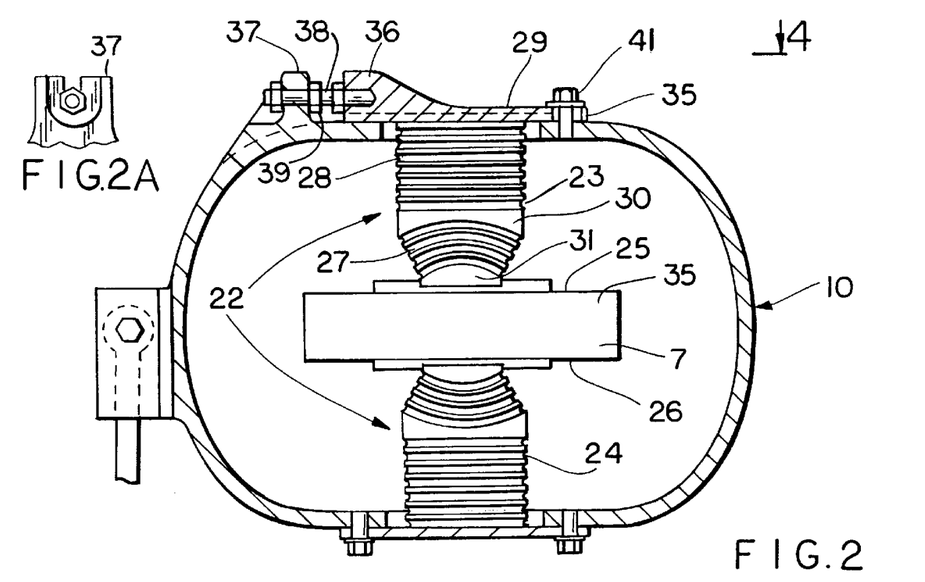
FIG. 2 is a view taken along line 2—2 of FIG. 1, showing the adjustment apparatus of the invention.
FIG. 2A is an end view of the lug and adjusting screw shown in FIG. 2.

Referring to FIG. 2, the blade assembly has a snubber damper set 22 which includes an upper snubber damper portion 23 and a lower snubber damper portion 24 which are located between the spar surfaces 25 and 26 and the top and bottom surfaces of the torque tube 10. The snubber damper set is of the elastomer type and serves to support the torque tube in a proper relationship with respect to the spar 7. The snubber damper set transfers pitch control rod loads from the torque tube through the snubbers and into the spar. The snubber damper set also controls pitch flap coupling which occurs when the spar moves in a flapping motion.

Each snubber-damper 23, 24 is preferably circular in cross-section, and comprises a spherical elastomer bearing portion 27 which is concentric about and supports the flexbeam 7 in position. The outer portion of the snubber-damper is a flat elastomeric damper 28. Both portions consists of alternate elastomer and non-extensible material laminates such that the end elastomer laminates of flat elastomeric damper 28 are bonded to an end plate 29 and race member 30, respectively, and the end elastomer laminates of the spherical portion 27 are bonded to the race member 30 and an inner support member 31, respectively. This bonding takes place during manufacture of each snubber-damper.

Figure 3A:
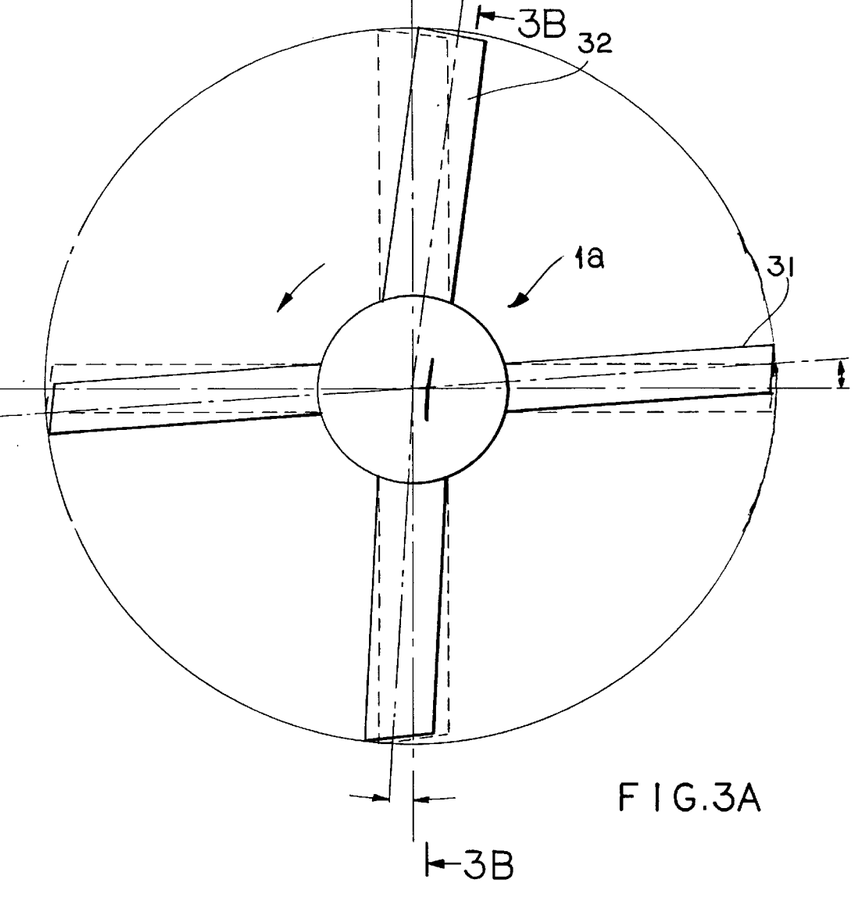
FIG. 3a shows a lead/lag track error.

Referring to FIG. 3a, a lead/lag track error is illustrated, for a four blade rotor 30. Of course, the same concept can be extended to rotors having other than four blades. As the blades rotate under loaded conditions, minor differences in manufacturing tolerances may result in a following blade 31 being at less than or more than a right angle for a four bladed rotor to a leading blade 32. This is illustrated by the phantom lines and arrows. This change in blade spacing alters the weight distribution of the assembly which may cause aircraft vibration. Of course, a slight angular difference at the hub is magnified to a large error at the blade tip.

Figure 3B:
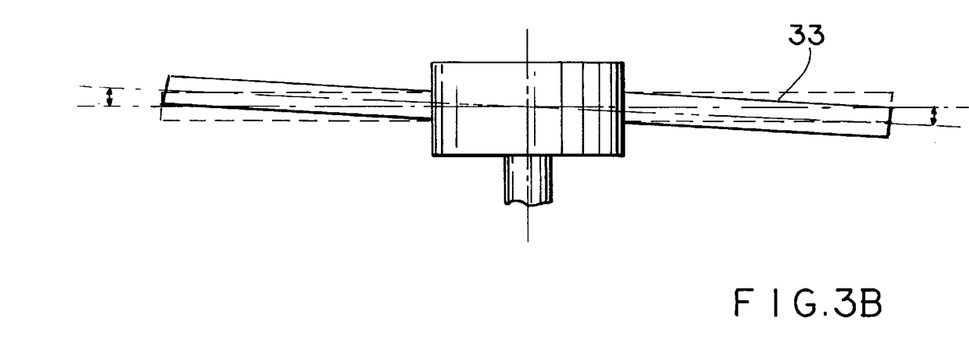
FIG. 3b shows a flap track error.

Referring to FIG. 3b, a flap track error is illustrated. Again, the four blade rotor 30 is shown, taken along line 3b—3b of FIG. 3a. Preferably the blades move in a common plane 33. However, due to differences in the stiffness of the damper components supporting the blades, the blades may move off track (flap) in either an upper or lower direction relative to the rotor plane causing a flapping error. This is illustrated by the phantom lines and arrows. Such an error results in an unbalancing of the rotor assembly which causes vibrations which are transmitted to the aircraft.

Figure 4:
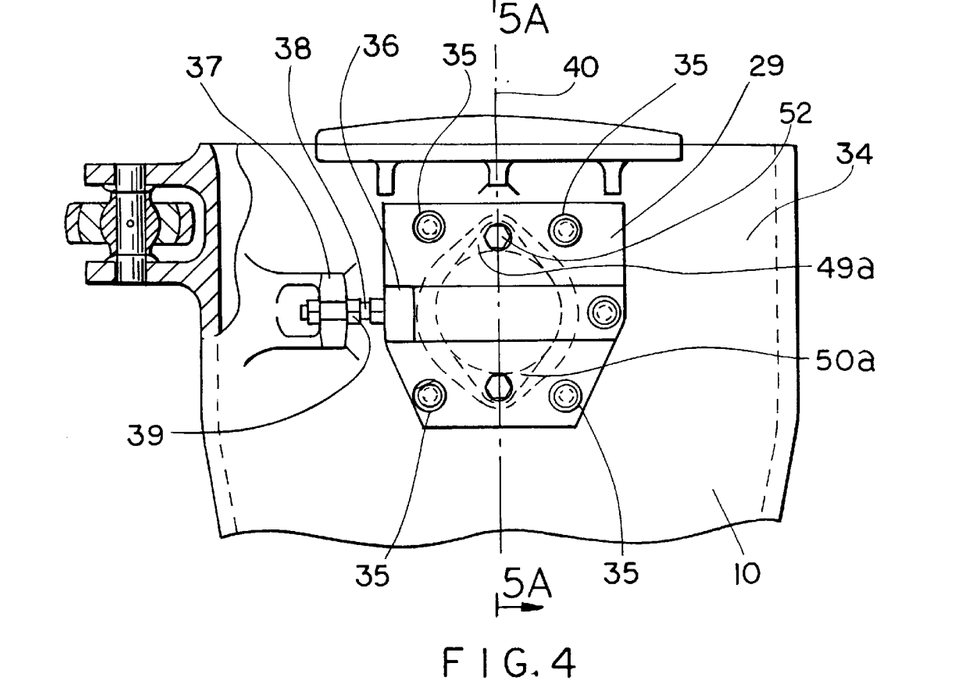
FIGS. 4 is an enlarged view taken along line 4—4 of FIG. 2, showing the lead/lag adjustment apparatus of the invention.

Referring to FIG. 4, the torque tube 10 has the end plate 29 of a damper bolted to a top surface 34 thereof. The end plate of the upper damper has a plurality of slotted holes 35 and has an end lug 36. A lug 37 is located on the torque tube top surface adjacent to the lug 36. A screw 38 extends between the lugs 36 and 37. The screw has lock nuts 39 associated with it for fixing the spacing between the two lugs and thus the position of the damper relative to the torque tube. The screw 38 operates in conjunction with the slotted holes in the end plate to allow adjusting the snubber position relative to an axis 40 of the torque tube. Generally, an adjustment of ±½ degree should be provided with this apparatus, to correct lead/lag errors, though greater or lesser ranges of adjustment are possible.

Referring again to FIG. 2, a bolt 41 passes through the slotted hole 35 to attach the end plate 29 to the torque tube 10. To adjust a blade attached to the flexible spar 7, the bolts 41 are loosened and the spacing between the lugs 36 and 37 adjusted using screw 38 to make the blade true with the axis of the spar through the hub. Once the blade is adjusted to the proper angular relationship with the hub, the screw is locked with the nuts 39 and the bolts 41 are tightened to fix the blade in that position.

Figure 7:
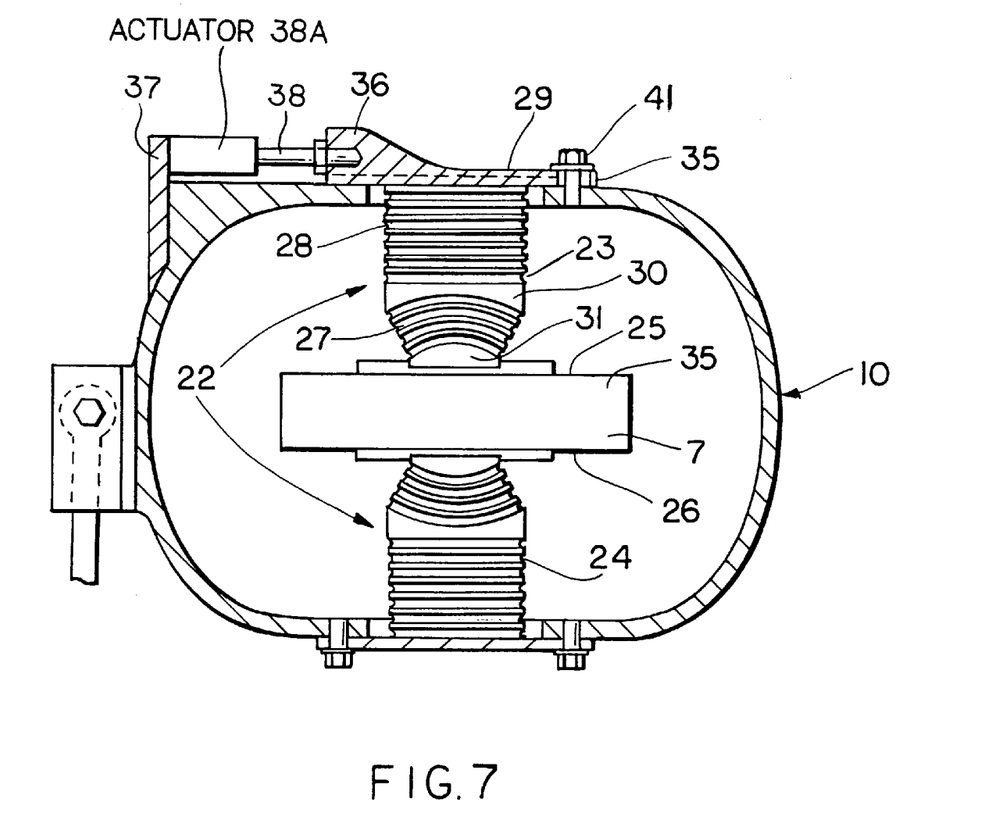
FIG. 7 shows the adjustment apparatus of the invention including an actuator.

While a manual screw adjustment device is shown, it is possible to utilize an actuator between the torque tube and end plate to adjust the blade spacing remotely. For example, an electrical, pneumatic or hydraulic actuator could be used to dynamically adjust the blade spacing during rotation of the rotor blades. In FIG. 7, an actuator 38a is provided for remotely controlling adjustment of the blade spacing. These actuators could be computer controlled and respond to position sensors mounted on the blades.

Figure 5A:
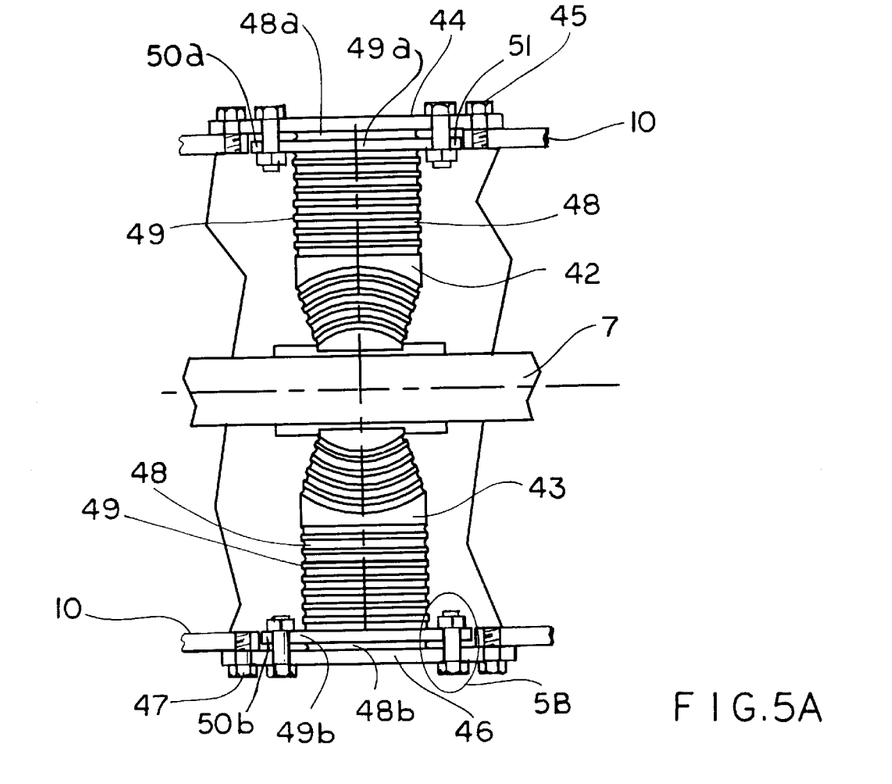
FIGS. 5a and 5b are views showing an adjustable snubber damper set according to the invention.
Figure 5B:
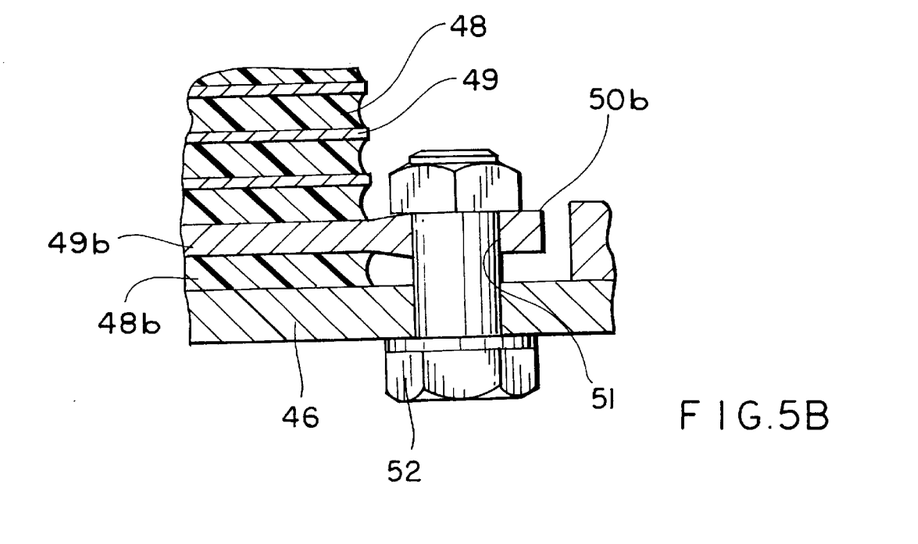

Referring to FIG. 5a, an adjustable damper set for reducing damper stiffness variation is shown. The flexible spar 7 is located between an upper snubber damper 42 and a lower snubber damper 43. The upper snubber damper has the end plate 44 for attachment to the torque tube 10 by bolts 45. The lower snubber damper also has an end plate 46 which is held by bolts 47 on the torque tube 10. Each damper includes a plurality of elastomeric plies 48 and a plurality of non-extensible shims 49, made of metal or composite, located between the plies. Each damper also has an enlarged shim, 49a and 49b respectively, located adjacent to a respective end elastomeric ply, 48a and 48b respectively. Extending portions 50a and 50b of each shim have through holes 51 for attachment of the shim by bolts 52 to the end plate, best seen in FIGS. 4 and 5b. Each end plate also includes corresponding holes for allowing passage of the bolts 52 therethrough.

Thus, each snubber damper includes an end plate for attachment to the torque tube and an extended shim which may be attached to the end plate for removing the motion of the end elastomer ply from the damper to thereby increase the stiffness of the assembly.

Preferably, each damper has an end laminate ply of designated stiffness, with the laminate ply of one damper preferably being different in stiffness from the laminate ply of the other damper. This can be accommodated by varying the thickness of the plys, or by the choice of different elastomeric materials, i.e. by substituting a synthetic rubber or silicon layer for a natural rubber layer. For example, a relatively thin elastomer layer can be incorporated in the upper damper to provide, for example, a 5 percent increase in stiffness if this elastomer layer were functionally eliminated. For the lower snubber damper, a thicker elastomer layer could be incorporated, with the removal of this layer producing an approximate 8 percent increase in stiffness. Each layer could be selected to provide a 2 to 10% stiffness increase for a total range of 4 to 20% per set. Consequently, if both layers were functionally eliminated, the damper assembly would have an increased stiffness of about 13 percent.

Figure 6A:
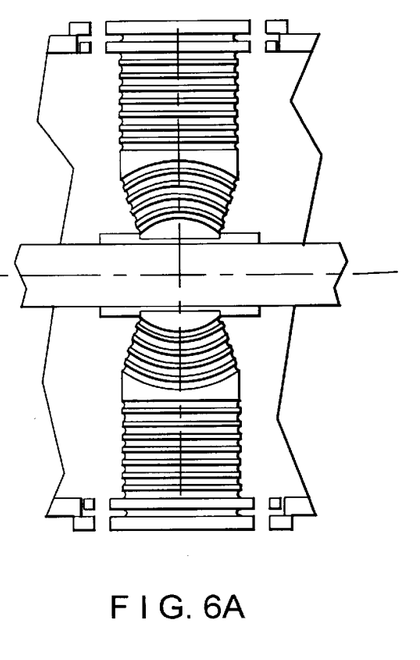
FIG. 6a shows the adjustable snubber set at a first stiffness setting, 6b at a second setting, 6c at a third setting, and 6d at a fourth setting.
Figure 6B:
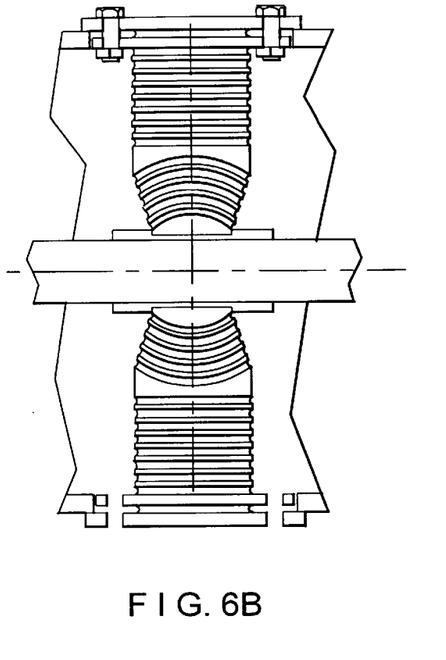
Figure 6C:
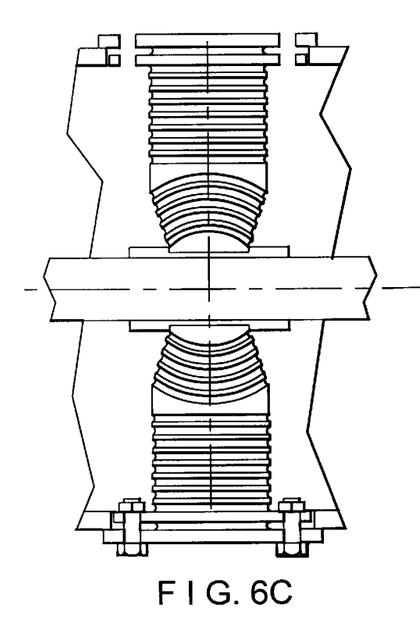
Figure 6D:
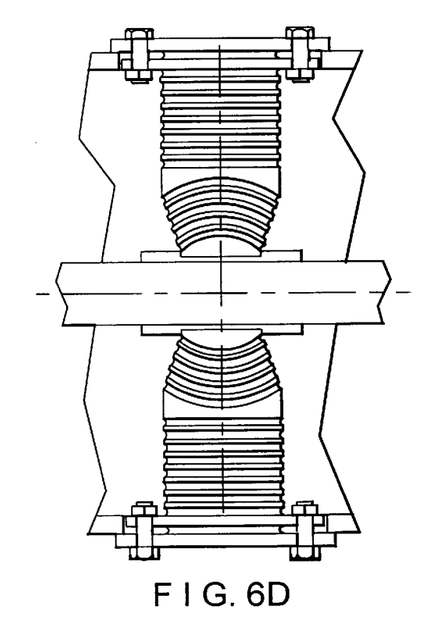

Referring to FIG. 6a–d, the four different adjustment levels for the damper are shown. In the first embodiment, neither of the non-extensible shims is attached to an end plate and thus the damper operates with all the elastomer plys and therefore it is in its softest condition (FIG. 6a). If an increase in stiffness is necessary, the upper shim is attached to the end plate and thus the stiffness of the assembly is increased by 5 percent (FIG. 6b). If this is considered inadequate, after testing or other evaluation, the bolts can be removed from the upper shim and used instead to bolt the lower shim to the end plate thereby creating an 8 percent increase in stiffness (FIG. 6c). If this is still inadequate, bolts can be used to attach both the upper and lower shims to the end plates, to produce a net increase of 13 percent in the stiffness of the assembly (FIG. 6d). Consequently, each blade can be adjusted to eliminate or at least to reduce the tracking error. Of course, these are illustrative values, and other variations in the percentage increase in stiffness can be accommodated according to the present invention.

Since the dampers may become softer with time in service, this system allows post-operation adjustment to return each rotor blade assembly to its initial stiffness, as an alternative to replacing the dampers entirely.

Utilizing the apparatus of the present invention, the rotor can be balanced to correct lead/lag and flap track errors through adjustments in the position of the blades relative to the hub and through the adjustment of the stiffness of the snubber dampers. This minimizes vibration and also provides more effective aircraft control, since such errors may inhibit effective transmission of pitch control changes to the blades.

While preferred embodiments of the present invention have been shown and described, it will be understood by those skilled in the art that various modifications and changes could be made without varying from the scope of the present invention.

We claim:

1. A helicopter rotor comprising flexible spar means, hub means retaining the spar means, a plurality of blades extending from the spar means, torque tube means associated with each blade, upper and lower damper means disposed on opposite sides of the flexible spar means for transmitting pitch control changes to the spar means from the torque tube means, and, adjustment means for adjusting the angular relationship of the flexible spar means to the hub means to correct tracking errors, the adjustment means comprising first and second end plates associated with the upper and lower damper means, and positioning means for adjusting the position of at least one of said end plated relative to the torque tube means to adjust the position of the spar means relative to an axis of the torque tube means.

2. The helicopter rotor of claim 1 wherein at least one of said end plates has a plurality of slotted holes, the slots orientated in a position perpendicular to the axis of the torque tube means.

3. The helicopter rotor of claim 1 wherein the positioning means comprise a position screw engaged between at least one of said end plates and the torque tube means for adjusting the position of at least one of the end plates relative to the torque tube means.

4. The helicopter rotor of claim 1 wherein the positioning means comprise an actuator disposed between at least one of said end plates and the torque tube for remote controlled adjustment.

5. The helicopter rotor of claim 4 wherein the actuator is either a hydraulic, pneumatic of electrically operated actuator.

6. A helicopter rotor comprising flexible spar means, hub means retaining the spar means, a plurality of blades extending from the spar means, torque tube means associated with each blade, upper and lower damper means disposed on opposite sides of the flexible spar means for transmitting pitch control change to the spar means from the torque tube means, and, adjustment means for adjusting the angular relationship of the flexible spar means to the hub means to correct tracking errors, each upper and lower damper means having an end plate for attachment of the respective damper means to the torque tube means, each damper means has a plurality of elastomeric plies with interleaved non-extensible shims, the outermost shim of each damper means located adjacent to its respective end plate, having an extending portion and including means for affixing to the respective and plate whereby attachment of one of the outermost shims or both of the outermost shims to the respective end plate sandwiches an end elastomeric ply therebetween to adjust the stiffness of the overall damper assembly.

7. The apparatus of claim 6 wherein one end elastomeric ply is of different stiffness than the other end elastomeric ply.

8. The helicopter rotor of claim 6 wherein the adjustment means comprise first and second end plates associated with the upper and lower damper means, and positioning means for adjusting the position of at least one of said end plates relative to the torque tube means to adjust the position of the spar means relative to an axis of the torque tube means.

9. The helicopter rotor of claim 8 wherein the positioning means comprises a position screw engaged between at least one of said end plates and the torque tube means, for adjusting the position of the end plate relative to the torque tube means.

10. The helicopter rotor of claim 8 wherein the positioning means comprise an actuator disposed between at least one of said end plates and the torque tube for remote controlled adjustment.

11. The helicopter rotor of claim 10 wherein the actuator is either a hydraulic, pneumatic or electrically operated actuator.

12. The helicopter rotor of claim 6 wherein at least one said end plated has a plurality of slotted holes, the slots orientated in a position perpendicular to the axis of the torque tube means.

13. A helicopter rotor comprising flexible spar means, hub means retaining the spar means, plurality of blades extending from the spar means, torque tube means associated with each blade, upper and lower damper means disposed on opposite sides of the flexible spar means for transmitting pitch control changes to the spar means from the torque tube means, and, means for adjusting the stiffness of the upper and lower damper means to correct tracking errors.

14. The apparatus of claim 13 wherein each upper and lower damper means further comprises an end plate for attachment of the respective damper means to the torque tube means, each damper means has a plurality of elastomeric plies with interleaved non-extensible shims, the outermost shim of each damper means located adjacent to its respective end plate, and having an extending portion and including means for affixing to the respective end plate, whereby attachment of one of the outermost shims or both of the outermost shims to the respective end plate sandwiches an end elastomeric ply therebetween to adjust the stiffness of the overall damper assembly.

15. The apparatus of claim 14 wherein one end elastomeric ply is of different stiffness than the other end elastomeric ply.

* * * * *